US011322944B2

(12) United States Patent
Bhatraju et al.

(10) Patent No.: US 11,322,944 B2
(45) Date of Patent: May 3, 2022

(54) METHODS OF OPTIMIZING ENERGY USAGE FROM ENERGY SUPPLIERS

(71) Applicant: Arcadia Power, Inc., Washington, DC (US)

(72) Inventors: Kiran Bhatraju, Washington, DC (US); Shannon Bauman, Decatur, GA (US); Owen Quinlan, Washington, DC (US); Nancy Hersh, Washington, DC (US)

(73) Assignee: Arcadia Power, Inc., Washington, DC (US)

( * ) Notice: Subject to any disclaimer, the term of this patent is extended or adjusted under 35 U.S.C. 154(b) by 45 days.

(21) Appl. No.: 16/925,707

(22) Filed: Jul. 10, 2020

(65) Prior Publication Data
US 2021/0296905 A1 Sep. 23, 2021

Related U.S. Application Data

(60) Provisional application No. 62/992,560, filed on Mar. 20, 2020.

(51) Int. Cl.
*H02J 3/38* (2006.01)
*G05B 13/04* (2006.01)
*H02J 13/00* (2006.01)

(52) U.S. Cl.
CPC ............ *H02J 3/381* (2013.01); *G05B 13/042* (2013.01); *H02J 13/00006* (2020.01); *H02J 2300/22* (2020.01); *H02J 2300/28* (2020.01)

(58) Field of Classification Search
CPC .. H02J 3/381; H02J 13/00006; H02J 2300/22; H02J 2300/28; G05B 13/042; G06Q 30/0613; G06Q 50/06; G06Q 10/063
See application file for complete search history.

(56) References Cited

U.S. PATENT DOCUMENTS

| 2013/0332000 | A1 | 12/2013 | Imes |
| 2017/0310161 | A1 | 10/2017 | Tokunaga |
| 2018/0342867 | A1* | 11/2018 | Poon ..................... G06Q 50/06 |

OTHER PUBLICATIONS

European Extended Search Report issued in EP21163782.2 dated Jun. 11, 2021, 1 page.
Australian Examination Report No. 1 for App. No. AU2021201743, dated Feb. 24, 2022, 3 pages.

* cited by examiner

*Primary Examiner* — Charles R Kasenge
(74) *Attorney, Agent, or Firm* — Butzel Long

(57) ABSTRACT

Implementations of the disclosed subject matter may provide a method includes determining, at a server, average historical usage of energy by a user based on received energy usage data. The server may determine at least one available energy usage plan from one or more energy providers based on the determined average historical usage of energy and by determining available energy rate structures. The server may determine an optimized energy usage from the one or more energy providers based on the determined at least one available energy usage plan. The method may include controlling, at the server, one or more setting of an energy usage device based on the determined optimized energy usage and a selected energy usage plan from the determined at least one energy usage plan.

11 Claims, 7 Drawing Sheets

METHODS OF OPTIMIZING ENERGY USAGE FROM ENERGY SUPPLIERS

CROSS-REFERENCE TO RELATED APPLICATIONS

This application claims priority to U.S. Application Ser. No. 62/992,560, filed Mar. 20, 2020, the disclosure of which is incorporated by reference in its entirety.

BACKGROUND

Presently, consumers seeking utility service (e.g., electricity, natural gas, and the like) to supply energy to a home or business are confronted with a complicated array of different plans, supplier options, and the like. In trying to determine the best options, consumers typically encounter complicated plans, multiple supplier options, community solar products, and more. Frequently, consumers do not have access to relevant pricing data for energy, nor the time to analyze the data, to make the best decision for their needs. Moreover, consumers often do not have the time nor the desire to optimize hardware devices, such as thermostats, to reduce rates of energy consumption.

BRIEF SUMMARY

According to an implementation of the disclosed subject matter, a method may be provided that includes determining, at a server, average historical usage of energy by a user based on received energy usage data. The server may determine at least one available energy usage plan from one or more energy providers based on the determined average historical usage of energy and by determining available energy rate structures. The server may determine an optimized energy usage from the one or more energy providers based on the determined at least one available energy usage plan. The method may include controlling, at the server, one or more setting of an energy usage device based on the determined optimized energy usage and a selected energy usage plan from the determined at least one energy usage plan.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter may optimize available energy provided by an energy supplier (i.e., utilities) to consumers. This may minimize the load on an energy system (e.g., that may include one or more energy suppliers) to provide energy at peak times of the day, and may allow energy providers to supply energy using renewable energy (e.g., solar, wind, hydro, and the like) with less pollution, and reduce the use of non-renewable sources (e.g., coal), which may typically have increased rates of emissions and/or pollution. Implementations of the disclosed subject matter may reduce the cost of energy for consumers by determining available services and costs, and adjusting one or more hardware devices of the consumer to control energy consumption throughout the day. This control may reduce energy costs for the consumer while providing the desired level of service from systems and/or devices that use energy. For example, energy consumption may be controlled so that energy may be used by a consumer at times when the energy system has a reduced demand and/or at times when energy costs may be reduced. Such control may reduce the amount of energy consumption, which may reduce and/or minimize the amount of energy that energy suppliers generate using non-renewable energy sources. Implementations of the disclosed subject matter may reduce the time and effort by a consumer to determine device settings and energy usage patterns to reduce the cost of the consumer's energy bill.

As "smart" devices become more prevalent, there is the possibility of adjusting operation of those devices and other devices that may be controllable within a home or other environment to achieve increased energy efficiency, decreased energy usage and/or cost, and improved timing of specific energy usage needs. However, most energy consumers may not have the time, ability, or interest in regularly adjusting their devices, utility usage plans, or the like that may be required to achieve the increased efficiency. For example, most energy consumers may not have access to complete data regarding what energy usage plans and costs are available, including whether specific providers use renewable, non-renewable, or mixed sources of energy. Consumers also may not have the knowledge or technical skill to correctly program devices such as thermostats, HVAC (heating, ventilation, and air conditioning) units, hot water heaters, electric vehicle chargers, or the like to take advantage of device capabilities that may improve the customer's energy usage efficiency. Some energy customers may use more energy once they begin using smart devices, possibly due to a belief that the devices themselves are more efficient. A similar phenomenon may occur when energy consumers are provided with "flat rate" energy contracts, where customers may increase their usage under the flat rate contract, thereby unintentionally offsetting efficiency gains that might otherwise be possible due to use of smart devices or other energy-saving or increased-efficiency devices.

Such effects may be referred to as "rebound" effects, and have been observed in flat bill trials in which customers were provided with flat billing rates for energy usage. In some cases, customers on a flat billing system may increase their usage by 6% or more. However, customers typically do not want to pay more and do not intend actually to use additional energy, and would still benefit from automated systems that improve their energy use efficiency without requiring intentional specific action by the customer.

Implementations of the disclosed subject matter may increase energy usage efficiency, reduce cost and complexity of energy selection and usage, and/or improve coordination and usage of smart and other devices within a home or other environment. To do so, energy customers may be provided with an "energy subscription" that allows the energy user (home or business customer, building owner/operator, etc.) to pay a fixed fee for their energy needs, while a system as disclosed herein manages energy supply and device options to achieve improved energy usage efficiency and decreased complexity for the end user, such as a customer of one or more energy providers or utilities. Alternatively or in addition, load management and other techniques may be used to reduce energy usage by a consumer. In conjunction, implementations of the disclosed subject matter may reduce overall consumption by 23% or more.

Implementations of the disclosed subject matter may use one or more sources of data and analysis tools to optimize a consumer's energy usage, resulting in decreased and/or predictable cost to the consumer, decreased complexity in setup, monitoring, and adjustment, and improved energy efficiency for the individual consumer as well the efficient allocation of energy resources.

In some implementations, data may be collected by a server from one or more of sources. Examples of the collected data may include, for example, the individual consumer's historical energy usage. One or more energy plans may be available to the consumer in his or her geographic location, such as Time of Use plans. Implementations of the disclosed subject matter may determine one or more energy suppliers available to a consumer based on the consumer's geographic location, including programs such as community solar. In some implementations, energy cost predictions may be based on weather changes, and/or availability of energy.

Implementations of the disclosed subject matter may recommend one or more energy suppliers to the customer. Some implementations may select, adjust, or re-selecting an energy supplier, an energy consumption plan, and/or a billing plan for the customer. Some implementations may consolidate pricing, usage, and/or timing information. Data sources may be selected and/or combined by a server to provide a customer of the most efficient energy plan available, given his or her historical usage. Efficiency of an energy plan may be determine based on total and/or or periodic cost to the consumer, and/or actual energy usage regardless of cost. Efficiency of the energy plan may be based on whether energy sources selected for the consumer are renewable or non-renewable, which may be weighted by the server and/or based on customer preference.

The data also may be used to inform automated operation of one or more devices in the customer's home or other location. For example, smart thermostats, smart hot water heaters, electric vehicle chargers, home batteries and other similar devices may be automatically controlled to operate during specific times of the day, such as to avoid peak use times and thereby achieve lower cost to the consumer. Similarly, the individual or overall operation of multiple devices may be considered in order to improve energy usage efficiency within the customer's home. In some cases, devices may be operated in a particular mode or turned off during utility-defined events, such as to reduce overall system load and thereby improve efficiency across the utility system, without causing noticeable disruption to individual consumers.

The data also may be used to provide more targeted information to consumers. For example, behavioral and educational messaging may be generated and provided to individual consumers based on their historical and/or current usage, such as where it is determined that different behavior may achieve the customer's apparent desire or goal while reducing energy usage or otherwise improving efficiency.

Implementations of the disclosed subject matter provide benefits to energy suppliers, utilities, and customers. For example, customers may receive decreased utility bills, predictable cost, and improved energy management with home devices and/or appliances, such as smart home devices, without direct operation by the customer. Customers may be insulated from a rebound effect through offsetting use of smart devices, such as where a smart thermostat is automatically adjusted to reduce overall consumption of energy by more than the use increase due to the rebound effect. The energy providers may benefit from reduced usage, improved efficiency especially during peak demand times, automatic matching of customers to desired energy sources, and the like.

Figure 1:
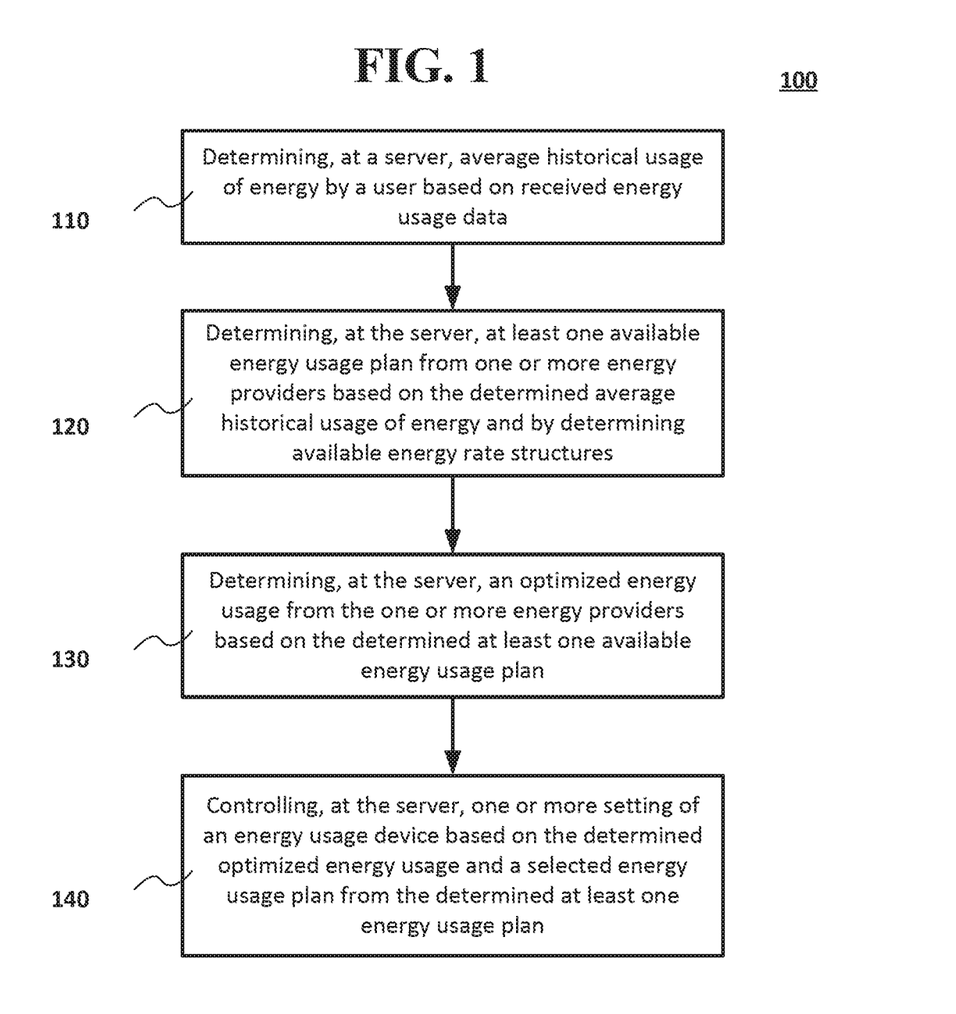
FIG. 1 shows an example method of determining an energy usage plan and controlling an energy usage using a device according to an implementation of the disclosed subject matter.

FIG. 1 shows an example method 100 of determining an energy usage plan and controlling the energy usage using a device according to an implementation of the disclosed subject matter. At operation 110, a server at a server (e.g., server 13, 14 shown in FIG. 7, and/or remote platform 17 and/or energy utility 18 shown in FIG. 7) may determine an average historical usage of energy by a user based on received energy usage data. For example, the server may determine the amount of energy used by a customer for one month, a plurality of months, and/or a year based on energy usage data received by the server. The energy usage data may be stored in the databased 15, the remote platform 17, and/or a storage device of the energy utility 18 shown in FIG. 7, and may be received by the server 13, 14 via the network 7. The energy usage data may include the times in which energy was used (e.g., whether energy was used at peak or off-peak times), the type of energy used (e.g., electricity from solar, wind, and/or hydro, and the like, and/or natural gas), and/or the amount of energy used (e.g., amount in kilowatt hour (kWh), or the like).

At operation 120, the server may determine at least one available energy usage plan from one or more energy providers based on the determined average historical usage of energy and by determining available energy rate structures. An energy provider may be a utility company that provides energy (e.g., electricity, natural gas, or the like) to a home, business, or the like. An energy usage plan may provide a cost for a predetermine amount of energy used during a predetermined period of time. For example, a customer may have a fixed monthly rate with a utility company to be provided with a predetermined amount of energy for the month. An available energy rate structure may be a cost for a particular type of energy (e.g., electricity) at different times in a day. For example, electricity from a utility company may have a first price per kWh (kilowatt hour) during a first range of time (e.g., 9 AM to 7 PM), and a second price per kWh during a second range of time (e.g., 7:01 PM to Midnight), and a third price per kWh during a third range of time (midnight to 9 AM). In this example, energy for the first range of time may have a higher cost per kWh than the second rage of time, and the energy may have a higher cost per kWh for the second range of time than the third range of time. That is, at operation 120, the server (e.g., server 13, 14 shown in FIG. 7) may select an energy usage plan from an energy provider (e.g., energy utility 18 shown in FIG. 7) based on the user's historic energy usage and the available energy rates.

At operation 130, the server may determine an optimized energy usage from the one or more energy providers based on the determined at least one available energy usage plan. For example, the server may determine when (e.g., what times of the day) the one or more user devices may use energy so as to have energy available at the least cost. Continuing with this example, the server may determine that there may be increased costs associated with using energy to heat or cool a user's home at 6 PM, and may determine to utilize available energy at 3 PM to pre-heat or pre-cool the user's home.

In some implementations, the server may determine whether there is optimized energy usage based on at least one available energy broker option, at least one available solar energy option, at least one available wind energy option, and/or at least one available efficiency reimbursement program. For example, the server may determine that a community solar project may provide the user with energy at a predetermined time period of the day at a reduced cost. In another example, the server may optimize energy usage by communicating with an energy broker (e.g., energy utility 18, remote platform 17, or the like shown in FIG. 7) to determine what energy providers and/or when energy may be available to power the user's devices at reduced costs. In yet another example, the server may determine whether one of the user's devices qualifies for an available efficiency reimbursement program. That is, as the user's device may use less energy when compared to similar devices, the user may be eligible to receive energy at a reduced cost and/or receive other financial incentives for having an energy efficient device.

In some implementations, the determining the optimized energy usage at operation 130 may be based on a user profile that includes one or more devices to be powered by energy provided by the one or more energy providers, history of timeliness of user payment for energy provided by the one or more energy providers, weather predictions for a predetermined period of time, devices of the user to control energy usage, and a selected user interest in changing energy providers. Pricing adjustments may be made to the energy usage plan based on devices included in the user profile. For example, the server may determine whether the user is an electric vehicle (EV) user and has a charger to charge the EV, and may increase the pricing of the energy usage plan to account for additional energy needed to charge the EV. In another example, the server may determine that the user has always made payments for energy service in a timely manner, and adjustments may be made to the cost of the energy usage plan to reward the user for the timely payments.

In yet another example, weather predictions may be used by the server to increase or decrease the costs of energy for the energy usage plan. For example, if long periods (e.g., a plurality of days, a week, two weeks, a month or the like) of hot weather (e.g., 80° F. or greater) or of cold weather (e.g., less than 45° F.), the server may determine that there may be increased energy demand to power HVAC systems to provide heating or cooling, and the cost of energy may be increased. If the weather prediction is for moderate temperatures (e.g., 55° to 70° F.), the cost of energy may be reduced, as there may be a surplus of energy available as the demand for energy to power HVAC systems may be reduced.

In another example, the server may determine, via the user profile, types of devices of a user which may determine the costs of the energy usage plan and optimized energy usage. In this example, the server may determine whether the user has devices such as a smart thermostat, an electric vehicle (EV) charger, and the like. If the server determines that the user has a smart thermostat device which may be used to optimize energy usage, the cost of the energy usage plan may be reduced. If the server determines that the user has an EV charger, the server may increase the costs of the energy usage plan, as the user may frequently require additional energy to charge the EV.

In a further example, if the server determines that the user is interested in one or more services that may encourage efficient and/or optimized use of energy, the server may select one or more available services and adjust the user's energy usage plan. This may reduce costs to the user, and may optimize the efficient use of available energy at predetermined periods of time during the day.

In some implementations, determining the optimized energy usage at operation 130 may include reducing a cost of energy provided by the one or more energy providers by selecting an energy usage plan of the at least one available energy usage plan. Costs may be reduced, for example, based on available broker options, where one or more brokers may offer reduced cost energy to a user. That is, the server may determine whether one or more brokers have excess energy that may be provided at a reduced cost, and may optimize the use of the excess energy by adjusting the energy usage plan to include the brokered energy, so that the user has energy at a reduced cost.

In another example, costs may be reduced based on the availability of one or more community solar options to the user. In this example, if the user is eligible for energy provided by a community solar facility, the usage of the energy generated by the community solar facility may be optimized by providing it to the user who is seeking energy, and the costs of energy may be reduced in the energy usage plan for the user.

In yet another example, costs may be reduced and energy usage may be optimized when the server determines whether any energy efficiency reimbursement programs are available for a user. The server may determine there is an energy efficiency reimbursement program for energy efficient furnaces, and, based on user profile information, may determine that the user's furnace qualifies under the terms of the energy efficiency reimbursement program. The server may provide reduced costs to the user for the energy usage plan based on the qualification for one or more energy efficiency reimbursement programs.

At operation 140, the server may control one or more setting of an energy usage device (e.g., device 20, 30 shown in FIGS. 6-8, which may be located and/or installed in a user's home or business) based on the determined optimized energy usage and a selected energy usage plan from the determined at least one energy usage plan. The energy usage device may be, for example, a smart thermostat, a smart refrigerator, a smart water heater, smart appliances, an electric vehicle (EV) charger, a battery, a person or laptop computer, a server, smart phones, tablet computing devices, wearable computing devices, or the like. For example, the server may control and/or program a smart thermostat so that heating or cooling is performed during non-peak times, so as to minimize energy costs and efficiently use energy that is available. In some implementations (such as described in connection with FIG. 8 below), the server may provide a schedule to the energy usage device. The schedule may be implemented by the device so that energy usage by the device and/or other devices communicatively coupled to the energy usage device be according to the times of day set by the received schedule.

Energy available during non-peak times may be generate by renewable energy sources, which may be generated with less emissions and/or less environmental pollution. In some implementations, a pre-programmed smart thermostat and/or other energy usage device may be provided to the user to manage energy based on the determined optimized energy usage and a selected energy usage plan.

Controlling the energy usage device based on the determined optimized energy usage and a selected energy usage plan improves over current systems and devices by optimizing the energy usage in view of the selected energy usage plan and reducing costs. In contrast, current systems and devices merely make suggestions for comfort level settings (e.g., turn up or turn down temperature of a smart thermostat) based on usage patterns.

Figure 2:
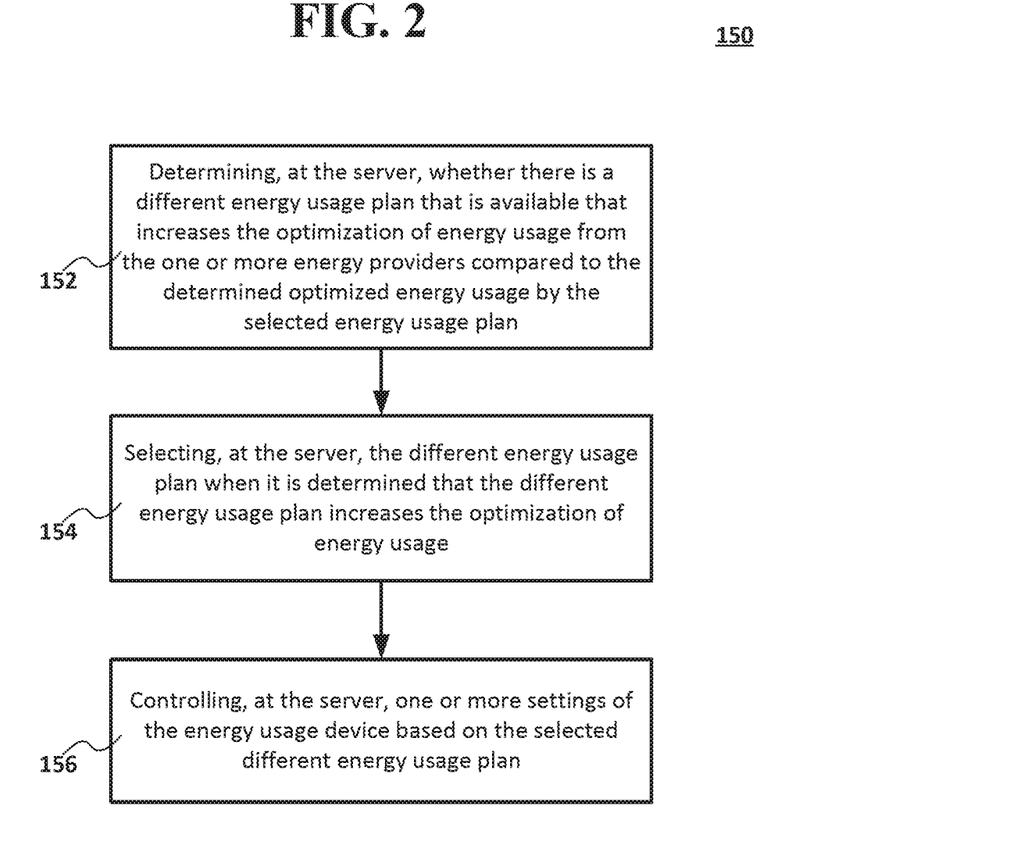
FIG. 2 shows additional example operations for the method of FIG. 1 which may determine whether there is a different energy usage plan available that increases the optimization of energy usage according to an implementation of the disclosed subject matter.

FIG. 2 shows additional example operations 150 for the method 100 of FIG. 1 which may determine whether there is a different energy usage plan available that increases the optimization of energy usage according to an implementation of the disclosed subject matter. At operation 152, the server (e.g., server 13, 14 shown in FIG. 7) may determine whether there is a different energy usage plan that is available (e.g., from energy utility 18, remote platform 17, and/or database 15 shown in FIG. 7) that may increase the optimization of energy usage from the one or more energy providers compared to the determined optimized energy usage by the selected energy usage plan. That is, the server may periodically (e.g., every day, every week, every month, every six months, or the like) determine whether there is a different energy usage plan available from an energy provider (e.g., a utility company), a broker, or the like that increases the optimization of energy and/or reduces costs when compared with the currently selected energy usage plan. The server may make this determination using data from the database 15, remote platform 17, and/or energy utility 18 shown in FIG. 7.

At operation 154, the server may select the different energy usage plan when it is determined that the different energy usage plan increases the optimization of energy usage when compared to the currently selected energy usage plan. If none of the newly-available energy usage plans increase the optimization of energy usage and/or reduce energy costs for the user, the server may maintain the currently selected energy usage plan for the user.

At operation 156, the server may control one or more settings of the energy usage device based on the selected different energy usage plan. For example, the server may adjust the settings of a user's smart thermostat to control the usage of energy for predetermined time periods of the day so as to optimize energy usage and/or reduce cost for heating and/or cooling a user's home.

Figure 3:
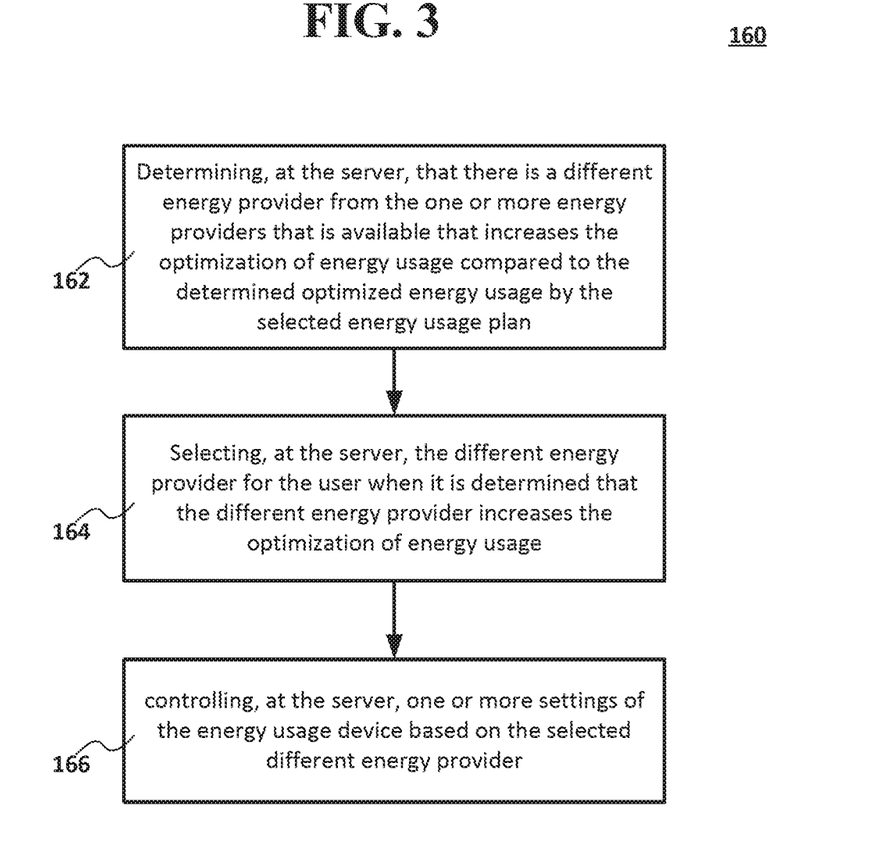
FIG. 3 shows additional example operations for the method of FIG. 1 which may determine whether there is a different energy provider available that increases the optimization of energy usage according to an implementation of the disclosed subject matter.

FIG. 3 shows additional example operations 160 for the method 100 of FIG. 1 which may determine whether there is a different energy provider available that increases the optimization of energy usage according to an implementation of the disclosed subject matter. At operation 162, the server (e.g., server 13, 14 shown in FIG. 7) may determine whether there is a different energy provider from the one or more energy providers that is available that increases the optimization of energy usage compared to the determined optimized energy usage by the selected energy usage plan. That is, the server may periodically (e.g., every day, every week, every month, every six months, or the like) determine whether there is a different energy provider that may increase the optimization of energy and/or reduces costs when compared with the current energy provider(s) of that provide energy based on the selected energy use plan. The server may make this determination using data from the database 15, remote platform 17, and/or energy utility 18 shown in FIG. 7.

At operation 164, the server may select the different energy provider for the user when it is determined that the different energy provider increases the optimization of energy usage. At operation 166, the server may control one or more settings of the energy usage device based on the selected different energy provider. For example, the server may adjust the settings of a user's smart thermostat to control the usage of energy based on the selected energy usage plan of the different energy provider.

Figure 4:
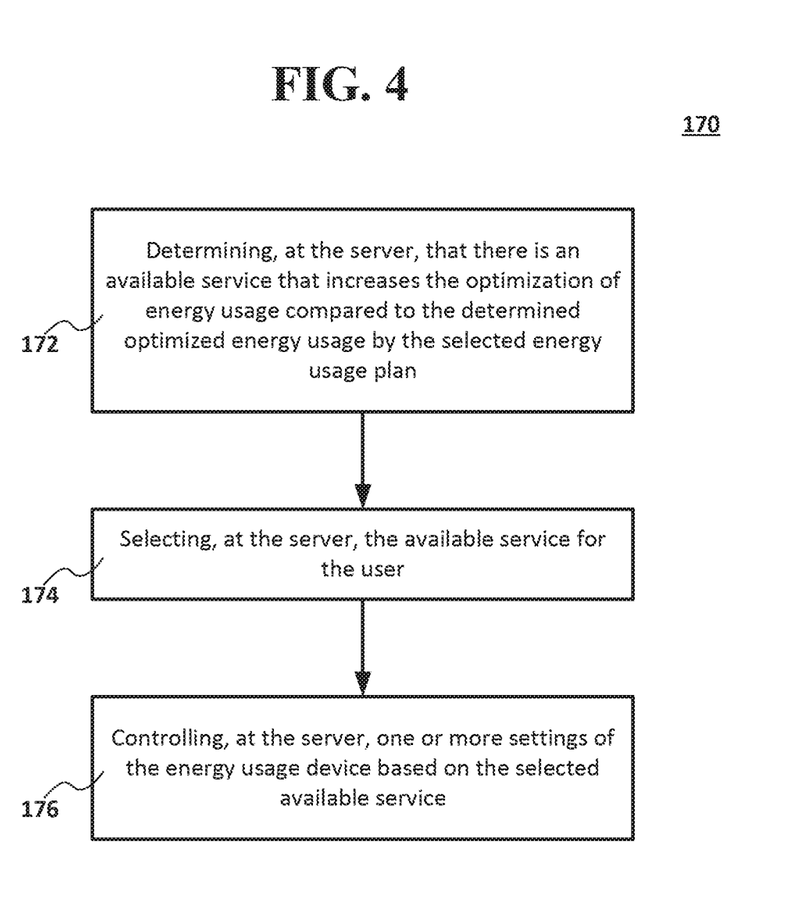
FIG. 4 shows additional example operations for the method of FIG. 1 which determines whether there is an available service that increases the optimization of energy usage according to an implementation of the disclosed subject matter.

FIG. 4 shows additional example operations 170 for the method 100 of FIG. 1 which determines whether there is an available service that increases the optimization of energy usage according to an implementation of the disclosed subject matter. At operation 172, the server may determine that there is an available service that increases the optimization of energy usage compared to the determined optimized energy usage by the selected energy usage plan. At operation 174, the server may select the available service for the user. At operation 176, the server may control one or more settings of the energy usage device based on the selected available service.

Figure 5:
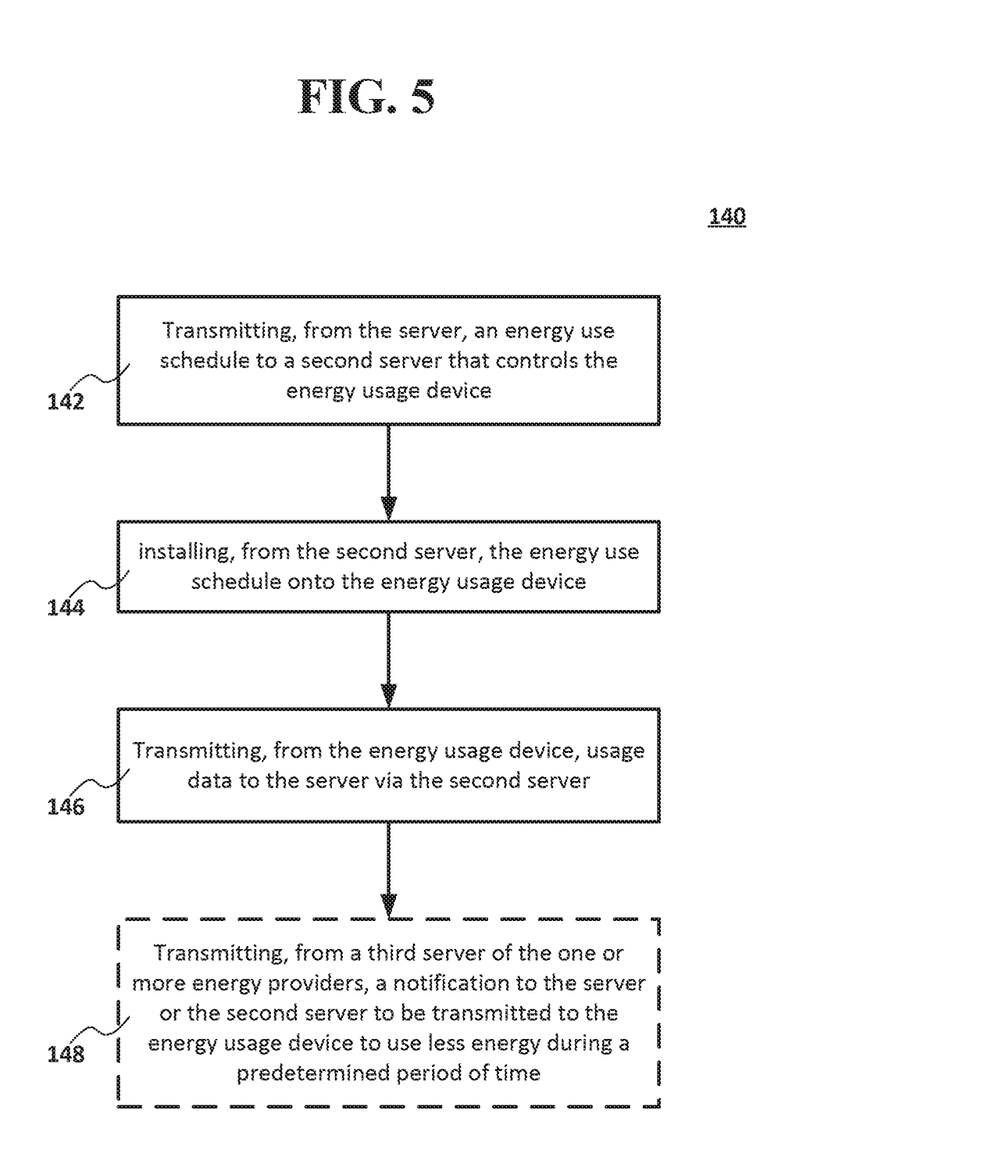
FIG. 5 shows additional example operations for the method of FIG. 1 which relate to controlling the energy usage device according to an implementation of the disclosed subject matter.

FIG. 5 shows additional operations for operation 140 for the method 100 of FIG. 1, which relates to controlling the energy usage device according to an implementation of the disclosed subject matter. At operation 142, the server (e.g., server 13 shown in FIG. 7) may transmit an energy use schedule to a second server (e.g., server 14 shown in FIG. 7) that controls the energy usage device (e.g., device 20, 30 shown in FIGS. 6-8). At operation 144, the second server (e.g., server 14) may install the energy use schedule onto the energy usage device. At operation 146, the energy usage device (e.g., device 20, 30) may transmit usage data to the server (e.g., server 13) via the second server (e.g., server 14). Optionally, at operation 148, a third server of the one or more energy providers (e.g., energy utility 18 shown in FIG. 7) may transmit a notification to the server or the second server to be transmitted to the energy usage device to use less energy during a predetermined period of time.

Figure 6:
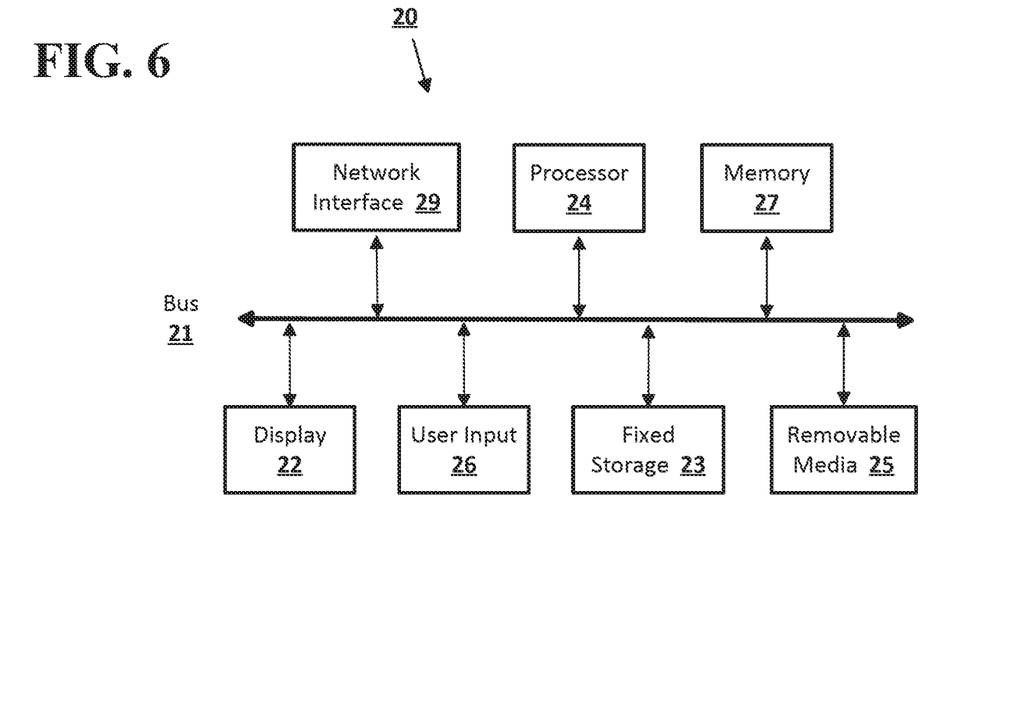
FIG. 6 shows a device, such as an energy usage device, according to an implementation of the disclosed subject matter.
Figure 8:
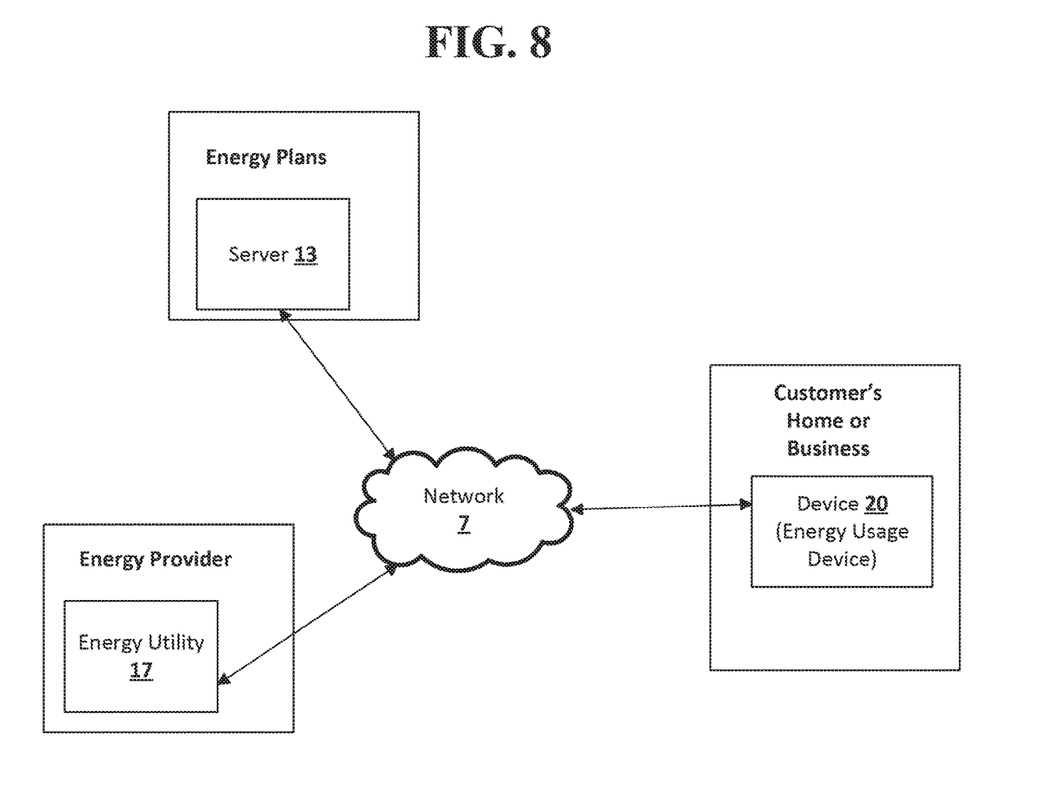
FIG. 8 shows an example network configuration based on the network configuration shown in FIG. 7 according to an implementation of the disclosed subject matter.

Embodiments of the presently disclosed subject matter may be implemented in and used with a variety of component and network architectures. FIG. 6 is an example device 20 (e.g., an energy usage device) suitable for implementing embodiments of the presently disclosed subject matter. The device 20 may be located and/or installed in a customer's home or business, as shown in FIG. 8. The device 20 may be, for example, a smart thermostat, a smart refrigerator, a smart water heater, smart appliances, an electric vehicle (EV) charger, a battery, a desktop or laptop computer, or a mobile computing device such as a smart phone, tablet, or the like. In some implementations, the device 20 may be used to control the energy usage of one or more other devices communicatively connected to the device 20. The device 20 may include a bus 21 which interconnects major components of the device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 20 are generally stored on and accessed via a computer readable medium, such as a hard disk drive (e.g., fixed storage 23), an optical drive, floppy disk, or other storage medium.

The fixed storage 23 may be integral with the device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network interface 29 may allow the computer to communicate with other computers via one or more local, wide-area, or other communication networks, as described in further detail below.

Many other devices or components (not shown) may be connected in a similar manner (e.g., sensors, energy use monitors, and the like). Conversely, all of the components shown in FIG. 6 need not be present to practice the present disclosure. The components can be interconnected in different ways from that shown. The operation of the device 20 such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
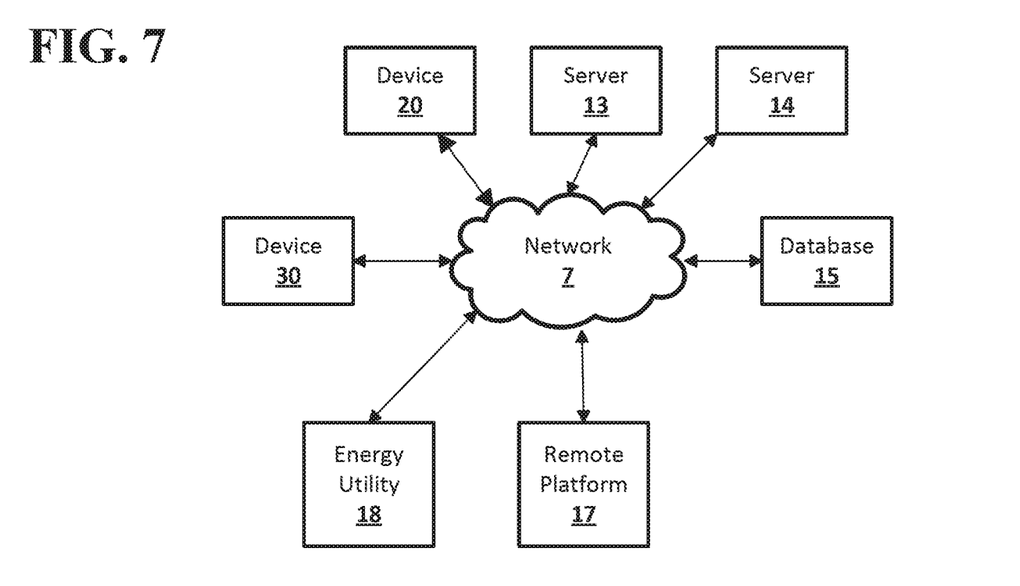
FIG. 7 shows a network configuration according to an implementation of the disclosed subject matter.

FIG. 7 shows an example network arrangement according to an implementation of the disclosed subject matter. One or more devices 30, such as a smart thermostat, a smart refrigerator, a smart water heater, smart appliances, an electric vehicle (EV) charger, a battery, local computers, smart phones, tablet computing devices, and the like may connect to other devices via one or more networks 7. Each device 30 may be similar to device 20 as previously described. The network 7 may be a local network, wide-area network, the Internet, or any other suitable communication network or networks, and may be implemented on any suitable platform including wired and/or wireless networks. The devices 20, 30 may communicate with one or more remote devices, such as servers 13, 14, databases 15, remote platform 17, and/or energy utility 18. The remote devices may be directly accessible by the devices 20, 30, or one or more other devices may provide intermediary access such as where a server 13, 14 provides access to resources stored in a database 15. The devices 20, 20 also may access remote platforms 17 or services provided by remote platforms 17 such as cloud computing arrangements and services, such as energy management services, energy brokers, and the like. The remote platform 17 may include one or more servers 13, 14 and/or databases 15. The energy utility 18 may include one or more servers and/or databases for energy utilities such as solar power plants, wind farm power plants, natural gas power plants, and/or other energy utilities.

FIG. 8 shows an example network configuration based on the network configuration shown in FIG. 7 according to an implementation of the disclosed subject matter. In this example network configuration, device 20 and/or device 30 may be located and/or installed in a customer's home or business, which may be remotely located from the server 13 and/or energy utility 17. The device 20 may be such as a smart thermostat, a smart refrigerator, a smart water heater, smart appliances, an electric vehicle (EV) charger, a battery, local computers, smart phones, tablet computing devices, and the like may connect to other devices via one or more network 7.

In the example network configuration shown in FIG. 8, the server 13 may provide a schedule for a selected energy usage plan to the device 20, which may be a smart thermostat. The schedule may set one or more times in which the smart thermostat may heat or cool the customer's home so as to minimize energy usage and/or minimize energy costs, while providing comfortable temperatures in the home for the consumer. The schedule may be based on energy rates provided by the server of the energy utility 17. If a different energy usage plan is selected as described above, the server 13 may transmit a different schedule to the smart thermostat and/or configure the smart thermostat based on the different schedule.

When the device 20, is an EV charger, a smart refrigerator, a smart water heater, a smart appliance, or the like, the server may transmit a schedule to one or more these devices so that the device may control its use of energy based on the received schedule. For example, when the device is an EV charger, the schedule may allow operation from midnight to 6 AM to efficiently use available energy and/or reduce costs of energy.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   determining, at a server, average historical usage of energy by a user based on received energy usage data;
   determining, at the server, at least one available energy usage plan from one or more energy providers based on the determined average historical usage of energy and by determining available energy rate structures;
   determining, at the server, an optimized energy usage from the one or more energy providers based on the determined at least one available energy usage plan;
   controlling, at the server, one or more settings of an energy usage device based on the determined optimized energy usage and a selected energy usage plan from the determined at least one energy usage plan;
   determining, at the server, that there is a different energy provider from the one or more energy providers that is available that increases the optimization of energy usage compared to the determined optimized energy usage by the selected energy usage plan; and
   selecting, at the server, the different energy provider for the user when it is determined that the different energy provider increases the optimization of energy usage.

2. The method of claim 1, wherein the determining the optimized energy usage comprises:
   determining, at the server, whether there is optimized energy usage based on at least one selected from the group consisting of: at least one available energy broker option, at least one available solar energy option, at least one available wind energy option, and at least one available efficiency reimbursement program.

3. The method of claim 1, wherein the determining the optimized energy usage is based on at least one selected from the group consisting of: a user profile that includes one or more devices to be powered by energy provided by the one or more energy providers, history of timeliness of user payment for energy provided by the one or more energy providers, weather predictions for a predetermined period of time, devices of the user to control energy usage, and a selected user interest in changing energy providers.

4. The method of claim 1, wherein the determining the optimized energy usage comprises:
   reducing, at the server, a cost of energy provided by the one or more energy providers by selecting an energy usage plan of the at least one available energy usage plan.

5. The method of claim 1, further comprising:
   determining, at the server, whether there is a different energy usage plan that is available that increases the optimization of energy usage from the one or more energy providers compared to the determined optimized energy usage by the selected energy usage plan.

6. The method of claim 5, further comprising:
   selecting, at the server, the different energy usage plan when it is determined that the different energy usage plan increases the optimization of energy usage; and
   controlling, at the server, the one or more settings of the energy usage device based on the selected different energy usage plan.

7. The method of claim further comprising:
   controlling, at the server, the one or more settings of the energy usage device based on the selected different energy provider.

8. The method of claim 1, further comprising:
   determining, at the server, that there is an available service that increases the optimization of energy usage compared to the determined optimized energy usage by the selected energy usage plan; and
   selecting, at the server, the available service for the user.

9. The method of claim 8, further comprising:
   controlling, at the server, the one or more settings of the energy usage device based on the selected available service.

10. A method comprising:of claim 1,
    determining, at a server, average historical usage of energy by a user based on received energy usage data;
    determining, at the server, at least one available energy usage plan from one or more energy providers based on the determined average historical usage of energy and by determining available energy rate structures;
    determining, at the server, an optimized energy usage from the one or more energy providers based on the determined at least one available energy usage plan; and
    controlling, at the server, one or more settings of an energy usage device based on the determined optimized energy usage and a selected energy usage plan from the determined at least one energy usage plan by:

transmitting, from the server, an energy use schedule to a second server that controls the energy usage device;

installing, from the second server, the energy use schedule onto the energy usage device; and transmitting, from the energy usage device, usage data to the server via the second server.

11. The method of claim 10, further comprising:

transmitting, from a third server of the one or more energy providers, a notification to the server or the second server to be transmitted to the energy usage device to use less energy during a predetermined period of time.

* * * * *